No. 774,365. PATENTED NOV. 8, 1904.
W. P. PHENIX.
COMBINATION MEASURING INSTRUMENT.
APPLICATION FILED JULY 13, 1904.
NO MODEL. 2 SHEETS—SHEET 2.
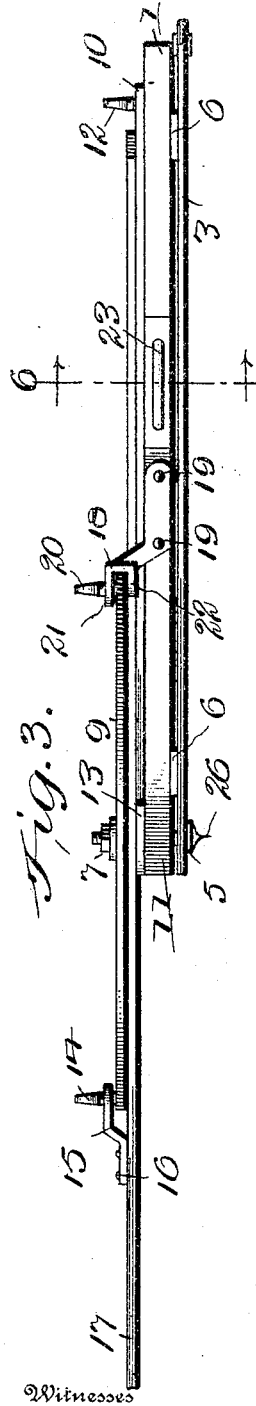
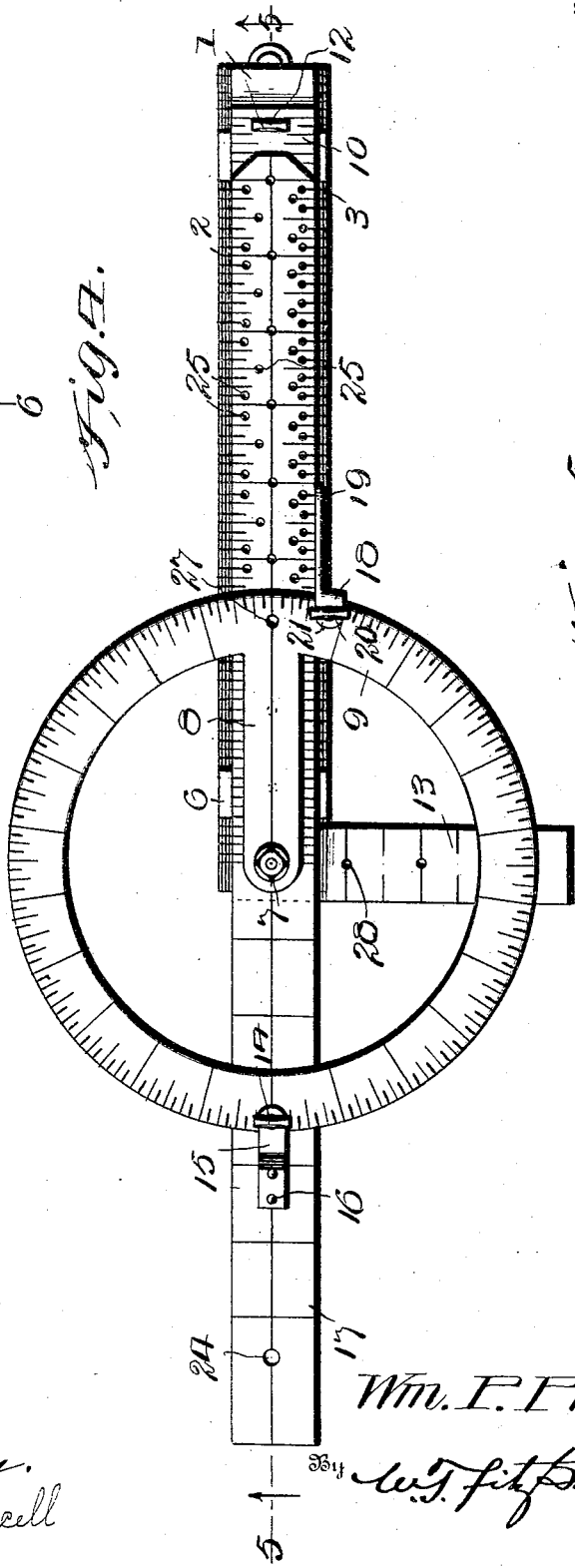
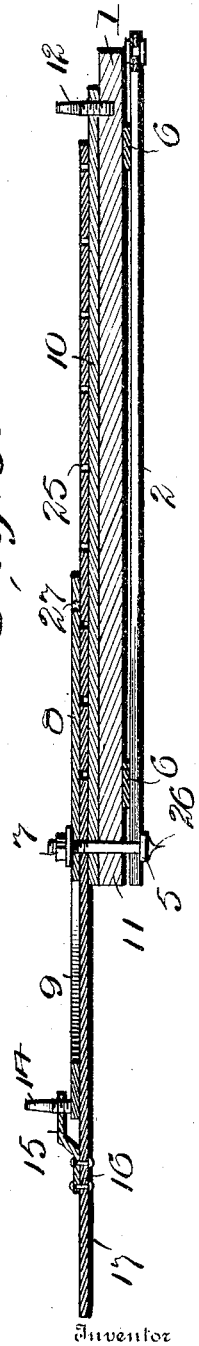
Witnesses
Inventor
Wm. P. Phenix.
By
Attorneys No. 774,365. Patented November 8, 1904.

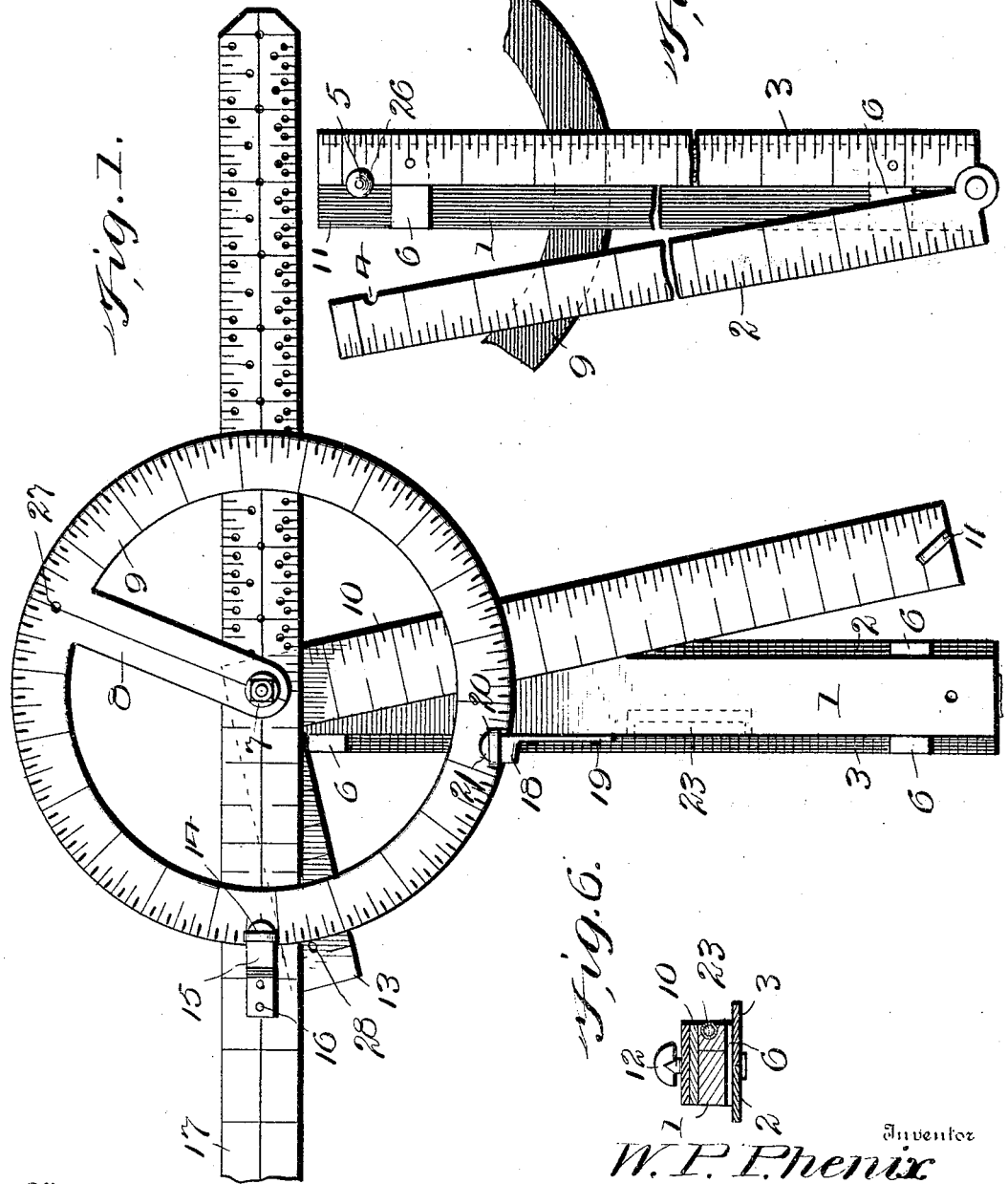

UNITED STATES PATENT OFFICE.

WILLIAM PRESTON PHENIX, OF TAHOKA, TEXAS.

COMBINATION MEASURING INSTRUMENT.

SPECIFICATION forming part of Letters Patent No. 774,365, dated November 8, 1904.

Application filed July 13, 1904. Serial No. 216,382. (No model.)

*To all whom it may concern:*

Be it known that I, WILLIAM PRESTON PHENIX, a citizen of the United States, residing at Tahoka, in the county of Lynn and State of Texas, have invented certain new and useful Improvements in Combination Measuring Instruments; and I do hereby declare the following to be a full, clear, and exact description of the invention, such as will enable others skilled in the art to which it appertains to make and use the same.

My invention relates to measuring instruments, and more particularly to the combination of a plurality of measuring implements or instruments of precision; and my invention consists of certain novel features of combination and construction of parts which will be hereinafter clearly set forth, and pointed out in the claim hereunto appended.

The prime object of my invention, among a number of others, is to group together a plurality of measuring devices whereby any one of them may be readily employed in the performance of its respective office without limitation or the impairment of the efficiency thereof.

Other objects and advantages will be hereinafter made plain, reference being had to the accompanying drawings, in which—

Figure 1 shows a plan view of my combination instrument complete ready for use. Fig. 2 is a detail view showing a portion of my measuring-rule properly graduated, as is common, and having one part thereof permanently connected to the body portion of the instrument. Fig. 3 is an edge view of my combination measuring instrument complete. Fig. 4 is a plan view of my instrument in a folded condition. Fig. 5 is a longitudinal sectional view of Fig. 4 on line 5 5 of said view. Fig. 6 is a sectional view of Fig. 3 on line 6 6 thereof.

My invention consists of a suitable body portion or holder to which are secured several different specified instruments each arranged to coöperate to complete any desired measurement which a carpenter or other mechanic may find desirable, and for convenience of description the various details of my invention will be designated by numerals, the same numeral applying to a similar part throughout the several views.

Referring to the numerals on the drawings, 1 designates the main or body portion of my invention, which is preferably rectangular in cross-section, though any preferred shape may be adopted, and to one side of the body portion I permanently secure in any preferred way one of the rule members or portions 3, the other portion thereof, 2, being left free to be swung outward and is provided with a recess 4, so that it will fit around the stem of the bolt or pin 5, and thereby enable the two sections of the rule 2 and 3 to be disposed parallel and in contact with each other upon the body portion 1, a pair of plates 6 being provided to hold the said members 2 and 3 slightly away from the body portion 1, as more clearly shown in Fig. 5. The bolt or pin 5 extends through the body portion and being threaded is provided with the locking-nut 7. The bolt 5 passes through an aperture in the inwardly-directed arm 8 of the traverse-wheel 9 and also passes through an aperture in the end of the body portion 1 and a hole in the end of the square 10, whereby said square may be pivotally secured in place, the free end thereof being provided with a slot 11, designed to receive the set-screw 12, the latter being entered in the end of the body portion 1, as shown in Fig. 5.

The square 10 is provided with the angular extension 13, as is common, and said instrument may be readily employed for any of the purposes for which it is independently suitable, or the body portion 10 thereof may be swung around in coöperative relationship with the traverse-wheel 9 in order that any proper angle may be drawn relative to the body portion 1, which latter may also be graduated, if desired, upon one or both surfaces.

The extreme ends of the bars 6 may be bent upward, so that the body portion 10 of the square may be sprung over said ends and be held against casual lateral movement upon the body portion 1.

The traverse-wheel 9 may be locked at any point by means of the set-screw 14, carried by the bracket 15, which latter is permanently secured, as by the rivet or bolt 16, to the graduated plate 17, which latter is also carried by the bolt 5 in engagement with the body portion 1.

By reference to Fig. 4 it will be observed that I have also provided a bracket 18, which is connected permanently to the body portion 1 by means of the bolts or rivets 19, and is designed to carry the set-screw 20, located in the lip 21. An auxiliary lip 22, Fig. 3, is also provided to coöperate with the lip 21, and said lips are intended to receive between them the edge of the traverse-wheel 9, the set-screw 20 being employed to lock said traverse-wheel at any desired point. By releasing the set-screws 14 and 20 it is therefore obvious that the traverse-wheel 9 is left free to turn upon its axis, and as the face of said wheel is properly graduated any desired measurement may be easily and accurately taken.

By reference to Figs. 3 and 6 it will be seen that the body portion 1 is provided, preferably near its central part and upon one edge, with a leveling-tube 23, disposed truly parallel with the edges and sides of said body portion, and said body portion therefore will serve as a reliably efficient leveling instrument in addition to the performance of its office as means for assembling and holding together the other parts of my combination instrument.

The graduated member 17 is provided near its outer end with an aperture 24, while throughout its entire surface or any portion thereof a plurality of apertures 25 is provided, and it is obvious that by means of said apertures a circle of any desired size may be marked out upon the surface of a piece of timber, board, or the like, as by entering the point of a pencil through any one of said apertures, the head of the bolt 5 being pointed, as indicated by the numeral 26, to serve as a fulcrum-point for the instrument, around which the point of the pencil may be moved after being entered through one of the apertures 24 or 25, as the case may be. My instrument, therefore, may be employed to serve as a compass whereby a circle of any desired circumference may be readily drawn. I have also provided in the traverse-wheel 9 an aperture 27 at the initial point of numbering the graduations thereon, and said aperture 27 may also be employed to receive a pencil-point for the marking out of a line of circle with my instrument. It will be further observed that the extension 13 upon the square 10 is provided with a plurality of apertures 28 to receive a pencil-point, thus enabling the extension 13 to be swung around upon the pivot-point 26 in the marking out of circles of less size than would be possible by the use of the apertures 24 and 25, located as shown in the drawings.

Inasmuch as the member 2 of my folding rule may be readily extended outward, the rule is available as a measuring instrument, to be employed in all cases where such an instrument is desirable, and when not required for further use the extension 2 may be readily folded up alongside of the member 3 and snapped over the upwardly-extended spring edge of the plate 6, whereby the semicircular recess 4 will fit around the stem of the bolt 5.

It will thus be seen that I have provided a combination instrument to serve a great variety of purposes, and believing that the construction and manner of using my invention have thus been made clearly apparent further description to the details thereof is deemed unnecessay.

What I claim as new, and desire to secure by Letters Patent, is—

The herein-described measuring instrument consisting of a body portion 1 having plates 6 secured thereto and also having a rule with one of its members 3 permanently secured to said plates while the other member is left free to snap over the outwardly-curved ends of said plates; a bolt 5 having a pointed terminal upon one end and a nut upon the other end fitting in an aperture in the end of said body portion; a traverse-wheel having an inwardly-directed arm 8 with an aperture to be received by said bolt whereby the traverse-wheel will be rotatably mounted thereon; means to lock the traverse-wheel against rotation; a leveling instrument carried by said body portion disposed truly parallel with the sides and edges thereof and a square comprising the members 10 and 13 pivoted to the body portion by said bolt, the said extension of the square having a plurality of apertures and a graduated bar 17 also secured in pivotal union with said body portion by said bolt and provided with a plurality of scribing apertures throughout its graduated surface, all substantially as specified and for the purpose set forth.

In testimony whereof I have signed my name to this specification in the presence of two subscribing witnesses.

WILLIAM PRESTON PHENIX.

Witnesses:
W. F. HUMPHRIES,
J. C. SOAPE.